Figure 1A:
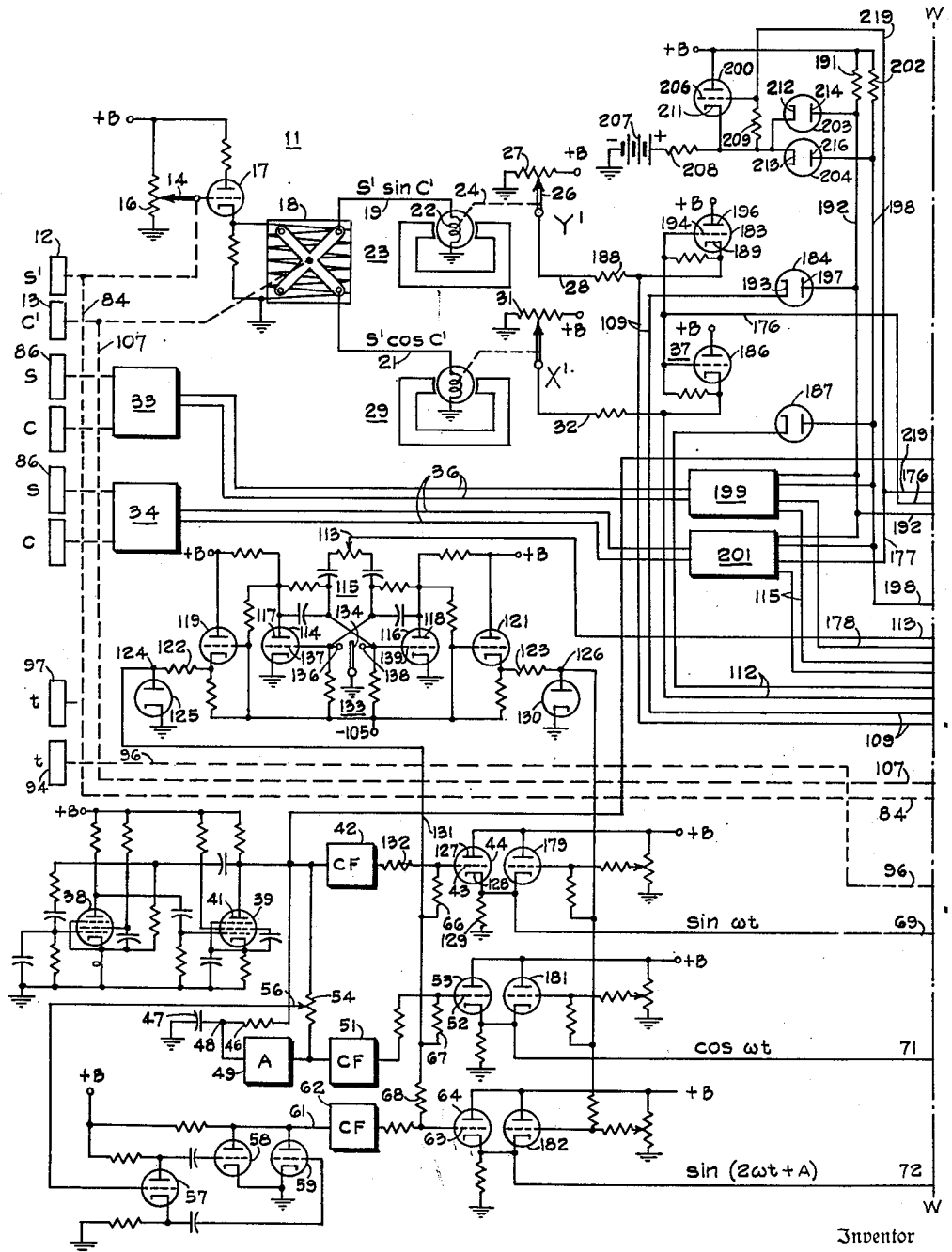

Inventor
EVERETT B. HALES

EVERETT B. HALES

April 13, 1954 E. B. HALES 2,674,812
PATTERN TARGET DISPLAY
Filed April 5, 1950 3 Sheets-Sheet 3

Inventor
EVERETT B. HALES
By
H. S. Mackey
Attorney

Patented Apr. 13, 1954

2,674,812

UNITED STATES PATENT OFFICE 2,674,812

PATTERN TARGET DISPLAY

Everett B. Hales, Mount Kisco, N. Y., assignor to General Precision Laboratory Incorporated, a corporation of New York Application April 5, 1950, Serial No. 154,047

17 Claims. (Cl. 35—10.4)

1

This invention pertains to pattern target displays and more specifically to representation, on the screen of a cathode ray tube, of the positions of targets in a single plane by means of symbolic patterns.

In the radar art a plan position indicator (P. P. I.) is well known as a cathode ray tube connected to display on its screen the output data of a radar receiver. These data consist of small luminous spots or arcs each representing the radar echo returned from an object in the field of the radar transmitter, and displayed orthogonally to form a map of the scene, field, or topography "seen" by the radar transmitter.

Radar trainers have been constructed to display on a P. P. I. synthetic data simulating radar data. In such a case a limited number of small luminous spots comprise the output data and respectively represent discrete objects which may be denominated as marine craft or aircraft. The positions of the spots on the screen represent the positions of the craft in a horizontal plane, and the motions of the spots are in accordance with the movements of the craft. Even the scanning effect of the antenna of a radar set may be simulated by a periodically alternating darkening and intensifying of each spot on the screen. The radar trainer described in the copending application Serial No. 108,900, filed on August 6, 1949, of Everett B. Hales, now Patent No. 2,555,442, dated June 5, 1951, is an example of such a device.

Obviously, the kinds of data concerning the target that can be presented by a simple luminous spot on a radar display scope are limited to position, speed and direction of motion. The speed and direction of motion are represented only in a purely qualitative manner by the velocity of the luminous spot across the screen, and a simple luminous spot is inadequate to represent in any quantitative manner any other attributes of the target. Such attributes which cannot be represented by the simple luminous spot include the identification of the target as friend or foe, the nationality of the target, type of craft, altitude of aircraft, and the existence of collision courses in two-dimensional representation.

These and any other desired data can, however, be indicated by depicting on the screen, at a point corresponding to the location of each target, a luminous spot or figure having various and special configurations and characteristics. Such characteristics may include intermittent blinking signals, or modification of the shape, size, or

2 configuration of the luminous spot. This method of indication is employed in the instant invention, and the luminous spot having such characteristics for depicting additional target data is herein referred to as a "target pattern," or simply a "pattern."

One of the main purposes of the instant invention is to provide apparatus for presenting on a cathode ray tube screen patterns conveying data about a radar target or about a simulated radar target, which data cannot be conveyed by a simple luminous spot or point source of illumination.

There is no technical limit to the complexity of design of such patterns, but simplicity of apparatus is obviously desirable, and therefore a preferred embodiment of this invention employs simple sinusoidal voltages combined in combination to produce Lissajous figures as indicia patterns. A very small number of sinusoidal voltages can be combined in a great many ways to produce a correspondingly large variety of distinctive Lissajous figures, each of which may be employed as a pattern to represent a particular target or a particular characteristic, thereof. These figures can be classified according to their geometrical appearance, to indicate certain characteristics as to whether the target is a friend or foe, the nationality or type of craft, and any other distinguishing characteristics. The individual pattern shapes can be made to signify other characteristics such as the individual target characteristics or identity or the height of aircraft. Another purpose of the present invention is to provide apparatus of the type described which will present a pattern on a cathode tube screen that includes an accurate indication of position.

Since the location of a target on the screen is the most fundamental attribute of the pattern, it is desirable for the pattern to include an easily recognizable point to serve as the exact position of the center of the target. Many Lissajous figures inherently have such a point, such as the cross-over point of a symmetrical figure eight. Others, such as the circle and ellipse, do not have such a marked point. When using such figures it is desirable to generate and insert such a point within the Lissajous figure, and this is most simply done by alternately displaying the pattern and the dot at a speed of alternation so fast that to the eye both appear simultaneously and without flicker.

Although a conventional P. P. I. display indicates the direction and movement of targets on the screen, this direction and speed of the actual targets, is qualitative only. By the use of patterns, however, a more literal representation of speed and course can be made. This is accomplished by making the length of the major axis of the pattern proportional to speed, and by orienting this major axis in the direction of the course of the target. When the pattern has longitudinal symmetry creating 180° ambiguity, a gap, for example, may be made in one end of the pattern to distinguish it from the other end, when it is utilized to indicate target course.

Another purpose, therefore, of this invention is to provide apparatus for quantitatively depicting the speed and course of a synthetic radar target by the size and attitude of the representative pattern of that target on a cathode ray tube screen.

As mentioned above, the length of the major axis of the pattern may be made to represent the speed of the target. An electrical quantity such as an unvarying voltage may be employed to control the length of this major axis, and if this quantity be multiplied in some manner by another quantity representing a period of time, the result will be representative of the distance. The effect on the pattern will be to elongate its major axis so that the end thereof indicate some future position of the target. If a similar operation be applied at the same time to another target whose course intersects that of the first target, and if the forward ends of the respective targets meet, it will easily become evident by inspection of the display while adjusting the time control that the targets will collide at some future time if neither target is changed in speed or direction.

Accordingly, another purpose of this invention is to provide apparatus for forecasting the collision of simulated targets.

Figure 1B:
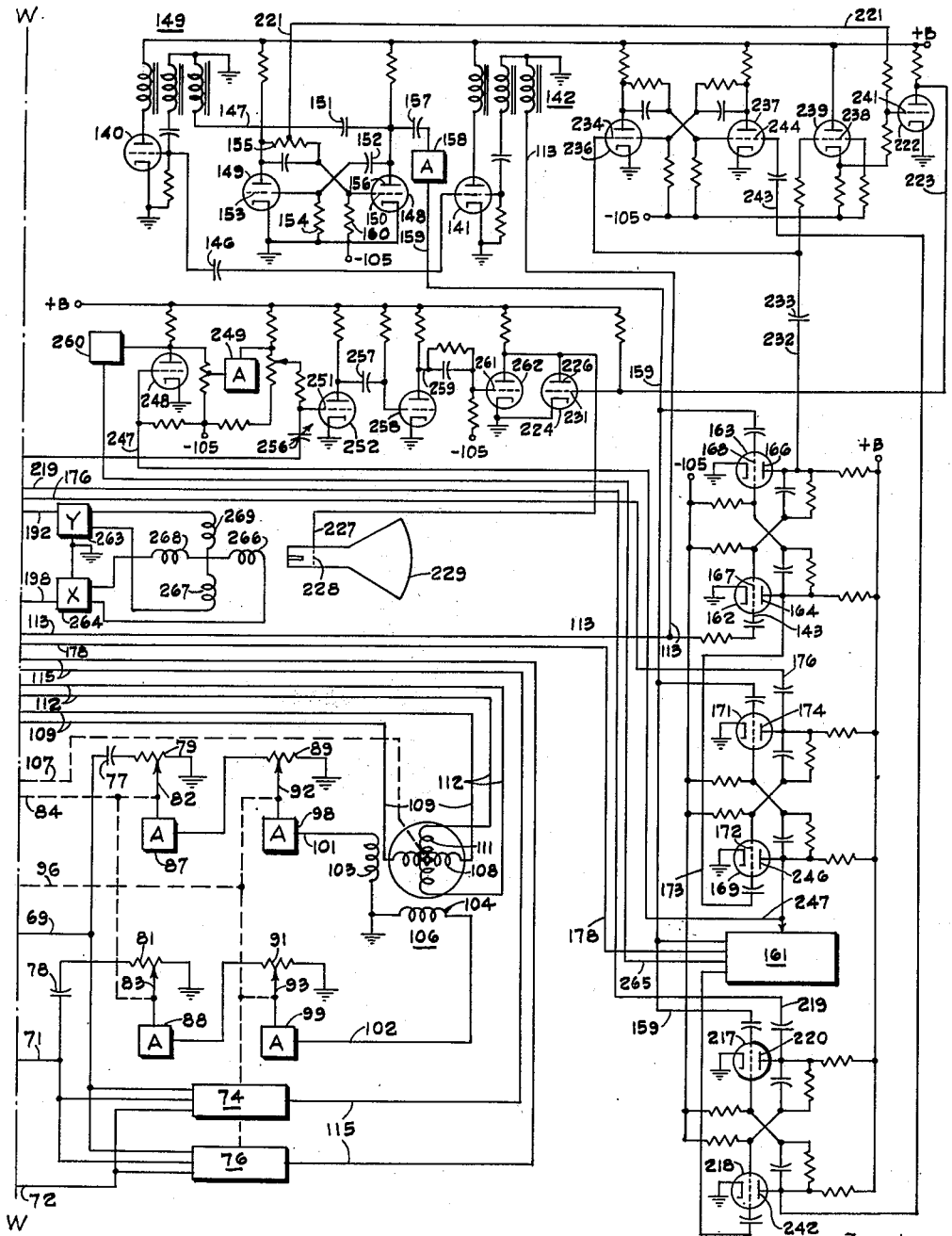

A better understanding of the present invention may be secured by reference to the detailed description and the accompanying drawing in which:

Figures 1A and 1B when joined together at the line W—W constitute a schematic diagram of the target display equipment of the present invention.

Figure 2:
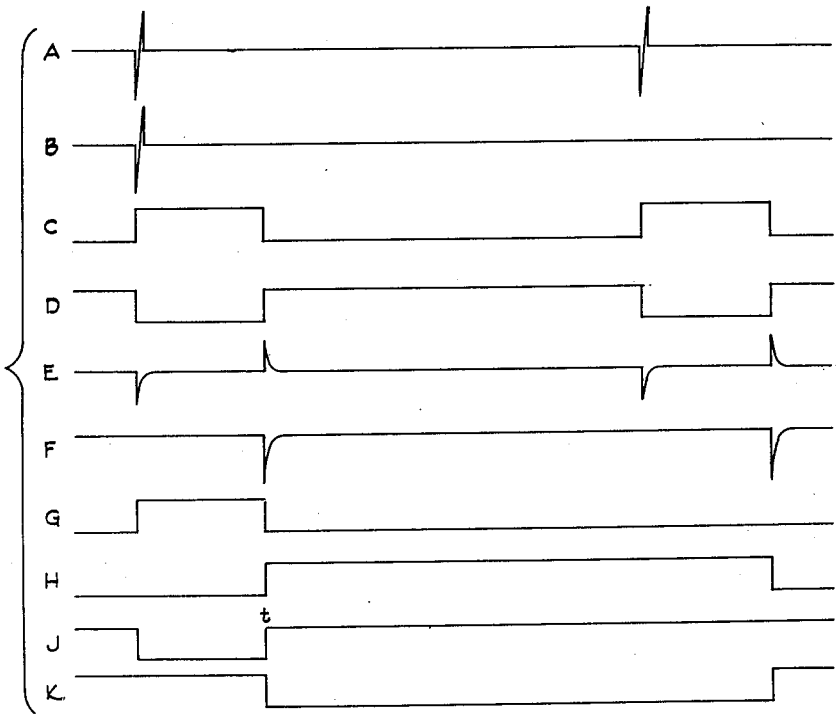
Figure 3:
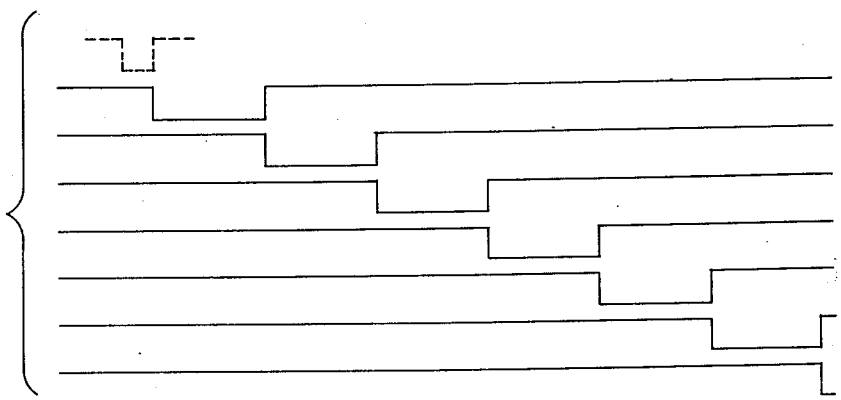

Figures 2 and 3 illustrate by curves the functions of several parts of the equipment.

The present invention is primarily intended as a training device capable of simultaneously simulating the various targets but it will be obvious that the invention may be used to display data from actual targets such as that which would be desirable in a central combat information center or the like.

Broadly speaking, the present invention comprises an apparatus and system in which several component units are associated with a conventional cathode ray tube, the component units being capable of so controlling the cathode ray tube as to display on the screen traces or spots which will convey special characteristics of the target in addition to relative position, direction and speed of movement. The various data relating to the different targets are presented sequentially. That is, all of the data relating to one target is presented on the screen and then the data relating to another target is presented subsequently, and so on, the sequence frequency being such that the period of the cycle is within the persistence of vision of the human eye so that it appears that the indicia for all of the targets are displayed simultaneously. Since it is desired to indicate movement of targets, the sequence frequency must be high enough to prevent "flicker." A special optional switching arrangement is provided so that two types of display are presented on alternate cycles. During one type of display the targets are represented by simple patterns, such as dots or arcs, which give the relative position of the targets while during the other display the targets are represented by more complex patterns of predetermined shapes which also indicate characteristics of the targets other than those of speed and direction movement.

One of the basic components of the present invention is the target position generator which supplies suitable potentials preferably direct current, to the deflecting means of the cathode ray tube to simulate the X and Y coordinates of the target position. Another basic component of the invention comprises a synchronous generator which, in effect, is a master oscillator to supply suitable trigger pulses which control the timing and generation of the appropriate cyclic voltages and their application to the cathode ray tube to produce the desired indicia patterns. It will be readily apparent from the previous remarks that one of the other components of the present invention comprises a commutator for alternately applying the target position voltages and the target characteristics data. The other components of the apparatus control the pulses of the sinusoidal pattern generator to produce the desired results.

In the illustrated form of the invention the target position generator consists of conventional potentiometers, preferably manually controlled, across which direct current voltages of constant values are impressed. Two potentiometers are required for each target. The voltages of the arms of the potentiometers are proportional respectively, to the X and Y coordinates of the target positions. The positional voltages are alternately applied with the other voltage pulses, which give other target characteristics, to the cathode ray tube by the deflection commutator. The latter contains two electronic switch circuits for each target to be simulated. Each pair of switches is operated by the target switch gate which in turn is controlled from the sinusoidal generator in the manner subsequently described. The cathode ray tube grid is energized under the control of the basic synchronous generator and the timing components to reduce or blank out the cathode ray between target displays.

The synchronous generator previously mentioned, provides three output signals, namely the cycle trigger pulses, target sequence trigger pulses and the intensifier gate pulses for the cathode ray tube. The cycle trigger pulses are generated by a free-running blocking oscillator which preferably can be adjusted from 30 to 60 pulses per second. The target switch trigger pulses are produced by a differentiation and amplification circuit which in turn is energized by a one-shot multivibrator the period of which is adjustable in duration. This one-shot multivibrator is triggered by a second free-running blocking oscillator, preferably adjustable from 600 to 3000 pulses per second. In order to synchronize the operation of the cycle trigger generator and the target switch trigger generator, a small capacity coupling is provided between them.

The cycle trigger pulses condition the system to present a cycle or series of indicia pattern displays. Once a cycle of presentation is completed all circuits remain quiescent until reactivated by a subsequent cycle trigger pulse. The function of the switch trigger pulses is to advance the deflection commutator from one target display to the next in the sequence so that these pulses determine the time interval which is devoted to the display of each target. The square waves produced by the second one-shot multivibrator constitute the intensifier gate pulses which are fed to the intensity gate mixer where the signals are combined with other gating and control signals to produce composite voltage pulses which are applied to the grid of the cathode ray tube to reduce or blank out the cathode ray between target indicia patterns. The derivation of the target switch trigger pulses from the termination of this square wave insures that the beam is on during the interval just preceding the transition to the next target. This is an important feature as will appear from the subsequent description.

A sequence timer which is controlled by the synchronous generator, provides square wave pulses which control the final link in the circuit between the deflection commutator and the cathode ray tube and also applies control pulses at the proper time to the intensity gate mixer. The square wave pulses are supplied from the sequence timer to the intensity gate mixer only when such is required for producing a desired pattern associated with one of the targets.

A pattern generator provides three separate sources of sinusoidal alternating current potentials; two of these potentials have a fixed relative phase displacement of 90° constituting a sine and cosine relation while the third is adjustable in phase between the first two. Associated with the pattern generator is a resolver in which the potentials are adjusted in amplitude and from which they are impressed upon the deflection commutator. The pattern generator also includes an alternate cycle switch gate generator which alternately supplies the direct current positional voltages only and then adds trains of alternating current potentials thereon and applies composite voltages to the deflection commutator so that on one alternate display cycle only dots will represent the target position while during the other alternate display cycle the characteristic pattern will be produced. The frequency of these pulses is such that the pattern and dots appear simultaneously to the human eye on the cathode ray tube screen. Suitable deflection circuits including special amplifiers and balancing tubes are provided between the deflection commutator and the cathode ray tube deflecting means for the purpose of keeping the difference in current in the two legs of the deflection yokes exactly in proportion to the difference in voltage between the two input terminals.

In the subsequent description it should be borne in mind that all circuits are completed through the chassis, indicated as ground in accordance with conventional practice, so that all potentials mentioned are relative to ground. Referring now to Fig. 1A, the target position generator 11 has two data knobs 12 and 13 by which the speed $S'$ and course $C'$ of a target, such as a marine vessel, may be set into the generator. The settings of these knobs constitute synthetic input data resulting in a simulated radar target representation on a cathode ray tube screen. The knob 12, associated with a scale calibrated in terms of speed, mechanically controls the position of a slider 14 of a voltage divider 16 across which is impressed a direct current potential. The potential of the slider 14 is thus made proportional to the input speed data and is passed through a decoupling cathode follower tube 17 to a sine-cosine potentiometer 18 of conventional construction angularly adjustable by the course knob 13 to an angle $C'$ equal to the course angle. The output conductors 19 and 21 of the potentiometer 18 consequently carry potentials, respectively, representing the speed $S'$ resolved into two mutually perpendicular components $S' \sin C'$ and $S' \cos C'$. It is obvious that integration as respects time of these resolved components of speed will produce resolved components of displacement. Therefore, each of the conductors 19, 21 is connected to the input of respective integrators. The integrators may be of any type having a voltage input and a voltage output, one of the simplest type being selected for the purpose of illustration, comprising a motor having a wound rotor and a permanent magnet field and a voltage divider operated by the rotor. The conductor 19 is connected to the armature winding 22 of a permanent magnet motor 23 of one of the integrators, the shaft 24 thereof being suitably connected mechanically to the slider 26 of a voltage divider 27, so that the output potential $Y'$ impressed by the slider 26 on the conductor 28 is representative of the integral of $S' \sin C'$. Similarly, the conductor 21 is connected to a second integrator comprising a second motor 29 and a voltage divider 31 which supplies to the conductor 32 a voltage $X'$ that is the integral of the quantity $S' \cos C'$. Obviously, the voltages $X'$ and $Y'$ represent the rectangular coordinates of the position of a target that moves with the speed $S'$ along a course $C'$.

The apparatus so far described simulates the coordinates of a target position. However, it is ordinarily desired to display simultaneously a number of target representations on a single screen, and the target position generator may therefore comprise as many as 40 generators all identical with that described, each being adjustable individually to any desired speed and course, which speed and course settings may also be reset at any time during a simulated problem. The rectangles 33 and 34 are therefore inserted in Fig. 1A to represent additional target position generator units. The several speed and course knobs, instead of being manually adjustable as described, may be under the automatic control of receivers of real data from actual maneuvering targets, in which case the cathode ray tube display would represent the maneuvering of actual craft.

The output voltages on conductors 28, 32 and 36 representing data from a number of target position generators, are applied to input terminals of a data-adding and coordinating electronic switch 37 herein termed a deflection commutator, to be described later. The deflection commutator, in addition to receiving these data indicating target positions, also receives signals that determine the sequence and frequency of presentation of the target data on the cathode ray tube screen. The deflection commutator likewise receives signals representing patterns from the pattern generator.

The pattern generator is capable of generating simultaneously and continuously an indefinitely large number of Lissajous figures by combining in various ways three simple sinusoidal waveforms, and by orienting the resulting Lissajous figures at different angles. The pattern generator consists of three principal components: an oscillator for generating various sinusoidal voltages from which Lissajous patterns are formed, a pattern former for combining these voltages in various ways to form as many different pattern voltages as there are targets to be distinguished, and an alternate gate to control the pattern outputs and to alternate them with simple position marking dots.

The pattern generator contains as its principal component a Wien bridge sine wave generator having two discharge tubes 38 and 39. The sine wave output of this well-known and stable form of oscillator is taken from the anode 41 of the tube 39 and is impressed through a cathode follower 42 on the control grid 43 of a switch tube 44, to be described in detail later. The anode 41 of the oscillator tube 39 is additionally connected to a phase-changing circuit consisting of a resistor 46 and capacitor 47 in series producing at its midpoint output terminal 48 a potential shifted 90° in phase. If therefore the sinusoidal output of the Wien bridge oscillator be regarded as having a sine waveform, the output of the phase-shifting circuit will have a cosine waveform. This output is amplified in an amplifier 49, and is fed through a cathode follower 51 to the control grid 52 of a switch tube 53 that will be described later in greater detail. The anode 41 of the oscillator tube 39 is additionally connected to one end of a voltage divider 54 having its other end connected to the output of the phase-shifting circuit. Since sources of sinusoidal potential differing by 90° in phase are thus fed to the opposite ends of this voltage divider, the potential of points on the voltage divider to which slider 56 may be connected will vary in phase over 90° along the length of the resistor. This slider is connected to a frequency doubler consisting of the three triodes 57, 58 and 59 connected in a conventional frequency doubling circuit to produce in the output conductor 61 a sinusoidal double-frequency potential having a phase controlled by the setting of the slider 56. This double-frequency potential is applied through a cathode follower 62 to the control grid 63 of a switch tube 64 that will be described later in more detail.

The three switch tubes 44, 53 and 64 under the control of the alternate cycle switch gate, open and close simultaneously the output connections from the three components of the pattern element generator in response to control signals impressed on their parallelled control grids 43, 52 and 63 through the respective decoupling resistors 66, 67 and 68. The three switch tubes 44, 53 and 64 are provided with cathode resistors constituting their output circuits. These output circuit are connected by the conductors 69, 71 and 72, which may be patch cord connections, to a pattern former, Fig. 1B.

The pattern former contains as many individual like units as there are patterns to be distinguished, but because these units are similar, only one is depicted in Fig. 1B in schematic detail while others are indicated by the rectangles 74 and 76. The pattern former unit that is shown in detail consists of two channels, each having five components. Each of the two channels is energized by any desired one of the three pattern element generator outputs, and in this example, the two illustrated channels are energized from the conductors 69 and 71, carrying respective voltages having a sine and cosine relation. The voltage pulses on conductors 69 and 71 are impressed through condensers 77 and 78 to grounded voltage dividers 79 and 81 respectively, the respective sliders 82 and 83 of which are mechanically coupled together and to the speed knob 12 of the target position generator through the shaft 84. The electrical outputs taken from the sliders 82 and 83 therefore have a sine-cosine relation and have magnitudes representative of the input speed S'. The absolute magnitudes of the potentials applied to the sliders 82 and 83 are controlled by several factors including the design of the scale of the speed knob 12 and the gain adjustments of the several amplifiers, so that the relative magnitudes of the slider potentials may be made whatever is desired. These two slider potentials are employed to form a single Lissajous figure, so that the relative magnitude of their potentials controls the relative dimensions of the Lissajous figure in two mutually perpendicular directions. To this end, two slider potentials are applied through decoupling amplifiers 87 and 88, to the ends of two grounded voltage dividers 89 and 91 which are provided with sliders 92 and 93, respectively. Because of this circuit arrangement the output potential at the slider 92, is representative of the product of the adjustment positions of the sliders 82 and 92, and the output potential at the slider 93 is similarly representative of the product of the adjustment positions of the sliders 83 and 93. The two sliders 92 and 93 are mechanically coupled together and through a shaft 96 are connected to a knob 94 that is calibrated in units of time. If it be considered that the sliders 82 and 83 are set proportionally to target speed, and that the sliders 92 and 93 are set proportionally to time, the output potentials at the sliders 92 and 93 will represent the respective products of the speed and time settings and therefore each will represent a distance value.

The voltage dividers 89 and 91 may be manipulated so as to predict the future courses of any desired targets including the collision courses of any two targets. The Lissajous figure formed by their output voltages and displayed on the cathode ray oscilloscope in a manner to be described will have, let it be assumed, a major axis, and let it be further assumed that this major axis is derived from and is proportional in linear magnitude to the setting of the speed voltage divider slider 82 as controlled by the speed knob 12, so that when the time voltage divider slider 92 is set to a prescribed calibration point the length of the major axis on the screen is proportional to and representative of the speed of the target to some desired and specified linear scale on the screen. Now if the output potential be increased by moving the slider 92 in the direction away from the grounded end, the length of the major axis as seen on the screen will be increased. The scale of the slider 92 is arranged to be proportional to time, so that if, for instance, the slider be set at +30 minutes, the forward end of the major axis of the pattern on the screen will be extended to a point on the screen representing the position that the target will occupy 30 minutes hence. If this operation be simultaneously applied to any other target pattern, the extended major axes may cross, and if they do, increase and decrease of the adjustment of the t knob 94 will reveal whether or not, at the instant of touching of the axes, their forward ends will meet at a point. If they do, the two courses are collision courses, and if the ends do not meet, no collision is forecast.

In Figs. 1A and 1B the mechanical linkage 84 between the speed knob 12 and the voltage divider slider 82 is extended to the slider 83, indicating that the knob 12 controls the magnitudes of both Lissajous figure components so that the size of the figure is controlled without change of its shape. As an alternative, only the major axis, represented by the potential of the slider 82, in this instance, might be controlled by the speed knob 12, in which case the slider 83 would have no connection with the knob 12, and speed adjustments would change the shape of the pattern as well as the length of its major axis. Each other target pattern former, represented by the rectangles 74 and 76, is individually adjusted so to target speed by individual speed knobs 86—86 of the individual target position generators represented by the rectangles 33 and 34.

Likewise in Figs. 1A and 1B the mechanical linkage 96 from the time knob 94 is extended to the major axis time slider 92, the minor axis time slider 93 and to the rectangles 74 and 76 indicating that, by use of the single knob 94, all major and minor axes of all targets can be simultaneously enlarged by a factor representing time to indicate future positions of all targets simultaneously while preserving all pattern shapes. Of course the mechanical connection from the knob 94, alternatively, may be made to all major axis sliders only, in which case increase of the knob adjustment increases all major axis dimensions. As another alternative, each target may have an individual time knob as indicated by the knob 97, or several selected targets may be controlled by one time knob.

The output potentials of the sliders 92 and 93 are amplified in amplifiers 98 and 99, which also decouple the sliders from following equipment. The respective outputs of the amplifiers are fed by conductors 101 and 102 to two stator coils 103 and 104 of a two-phase to two-phase synchro 106. This synchro has a rotor shaft 107 that is mechanically connected for control by the course knob 13 of the target position generator 11, so that when the course knob 13 is set to zero azimuth position the major axis of the pattern will appear at zero azimuth on the screen. This will be the result when the stator coil 103 is in maximum inductive relation to the rotor coil 108 as will be further explained. There will exist at the same time minimum inductive relation between the minor axis stator coil 104 and the same rotor coil 108. The rotor coil 108 is connected by conductors 109 to that portion of the deflection commutator 37 that receives the potential Y' from the conductor 28, and this portion of the deflection commutator affects only the Y-axis deflection of the cathode ray tube as will be described later. Similarly, the voltage for controlling the minor axis deflection, which corresponds to the X-axis, is provided by the rotor coil 111 which is in inductive relation with respect to synchro stator coil 104 and which is energized from conductor 102. The voltage from coil 111 is supplied through conductors 112 and the deflection commutator to the X-axis deflection coils of the cathode ray tube and controls the X-axis deflection. Obviously, if the rotor of the synchro 106 be rotated 90 electrical degrees the functions of the rotor coils 108 and 111 will be reversed, so that major axis pattern potential will be applied exclusively to the tube in the direction of its X-axis and minor axis pattern potential will be applied in the direction of the X-axis. At intermediate synchro positions the orientation of the screen pattern will appear at corresponding intermediate angles, in all cases without change of shape of the pattern.

Additional pattern generators represented by the rectangles 74 and 76 are connected through groups of conductors represented by the two lines 115 to the deflection commutator 37.

It is desirable to project the pattern or position dot representing each target upon the cathode ray tube screen with such rapidity that all target representations will appear to be continuously visible and no flicker will be obvious. To accomplish this result advantage is taken of the phenomena of persistence of vision and of persistence of the luminescence of the target spot after removal of the cathode ray excitation. Each target spot is illuminated in turn, and after all target spots have been illuminated once, the cycle is repeated. The cycle repetition rate should be high enough that the illumination of each spot appears to the eye to be continuous because of the above-mentioned characteristics. In this procedure, the number of times per second that the cycle is regularly repeated is termed the cycle frequency. To minimize flicker this frequency should be not less than 30 per second; in this example it is taken as 60 per second. The speed with which the cathode ray progresses from target to target determines the target sequence frequency, which is defined as the reciprocal of the period from the beginning of illumination of one target to the beginning of illumination of the next. In this example, this period is 417 microseconds so that the target sequence frequency is 2400 targets per second. Since the cyclic frequency is 60, time is thus provided in this example for the successive display of 40 targets in sequence in each cycle. But in order to increase the generality of the example only 30 targets are used therein, so that one cycle consists of the consecutive display of 30 targets requiring 416 microseconds apiece or a total of 12,500 microseconds, and then a rest period of 4166 microseconds, after which another cycle commences.

Some Lissajous figures, such as the figure eight with equal lobes, inherently have a defined center point, and when used in the instant invention such patterns thus specifically indicate the exact location of the represented target on the screen and in the field. Other Lissajous figures, however, such as the ellipse, have unmarked centers and when such figures are employed as patterns in the instant invention a dot is inserted to mark the center of each, by confining the display of the pattern to alternate cycles and displaying only the marker dot in the remaining cycles. The frequency of each type of presentation being 30 c. p. s., only negligible flicker results and to the eye both the pattern and the center dot appear to be continuously and simultaneously presented. In the instant invention a switch previously referred to as an alternate gate is provided by which such patterns with center dots may be displayed, or patterns alone or center dots alone may be displayed. This is accomplished in the following manner.

A cycle frequency is generated in a manner to be later described and from each cycle thereof there is derived one sharp negative pulse having therefore the cyclic frequency of 60 cycles per second. This pulse is transmitted through the conductor 113 and is employed to trigger a scale-of-two or bistable multivibrator termed the alternate gate multivibrator 115 and consisting basically of the two triodes 114 and 116, Fig. 1A. The multivibrator rectangular outputs of opposite phase are taken from the anodes 117 and 118, respectively, through two decoupling cathode followers 119 and 121 and two resistors 122 and 123 and are impressed on two gate output terminals 124 and 126, respectively. Two diodes, 125 and 130, are connected respectively with one between each of these terminals and ground, with the anode of each connected to the respective terminal, thus limiting the increase in potential of each terminal to that of ground as a maximum while the negative potential of each is not limited by the diode and is determined by the multivibrator characteristics. The output potentials of the alternate gate at the terminals 124 and 126, therefore, are rectangular in form and are of opposite phase with maximum positive values equal to ground potential.

The three switch tubes 44, 53 and 64 hereinbefore mentioned are alike and have the similar function of switching the pattern elements consisting of the sine potential on the conductor 69, the cosine potential on the conductor 71 and the double-frequency sine potential on the conductor 72. The switching operation consists in permitting these potentials to pass during alternate cycles of the cycle frequency and interrupting them the remainder of the time. The switch tube 44 is a triode having a positive potential directly applied to its anode 127 and having its cathode 128 connected to ground through the resistor 129. It is of such type that when its control grid 43 is at ground potential, normal anode current will flow and a large positive potential will be impressed on the output conductor 69. The grid 43 is connected through the resistor 66 and conductor 131 to the alternate gate output terminal 124 and also through the resistor 132 to the sine generator output from the cathode follower 42. As the result, when the terminal 124 is at ground potential, current flows in the triode 44 and is modulated in accordance with the sinusoidal pattern potential received from the cathode follower 42, so that the output potential impressed on the conductor 69 consists of direct current sinusoidally modulated. However, during the half cycles of the cyclic frequency when the terminal 124 is highly negative, the triode 44 is cut off, and no sinusoidal potential reaches the conductor 69.

The operation of the alternate switch tubes 53 and 64 is similar to that of the switch tube 44 just described and they control respectively, the cosine and double frequency outputs of the cathode followers 51 and 62 simultaneously with control by the tube 44 of the sine output, so that description of their connections and operation in detail is believed unnecessary.

The common function of all three switches is to permit the three pattern element generator voltages to pass simultaneously during alternate half cycles of the alternate gate through the respective conductors 69, 71 and 72 and to interrupt these voltages during remaining half cycles, as before stated. The result, as will be described, is to permit alternate pattern displays on a cathode ray tube screen during alternate half cycles. During remaining half cycles the location of each target is indicated by a luminous spot or point. The position of each target spot and the generation of the potential for forming the spot are initiated by the output of the target position generator, and are modified and communicated therefrom to the display tube in a manner that will be described later.

In order to permit display of patterns simultaneously with center dots therein, or of patterns alone, or of center dots alone, a manual 3-position switch 133 is provided in the alternate gate circuit.

In its left position the grounded armature 134 is connected through the switch point 136 to the control grid 137 of the tube 114, and in the right position of the switch the grounded armature is connected through the switch point 138 to the control grid 139 of the tube 116. When the switch is in its center position it is open and the operation of the alternate gate circuit is as described above, both patterns and center dots being displayed. When, however, the grid 137 is grounded, by movement of switch lever 134 to the switch point 136, the triode 114 is held in the conductive condition, cutting off the decoupling triode 119 and in turn applying a high negative potential continuously to the grids 43, 52 and 63 in parallel, of the switch tubes 44, 53 and 64 respectively, rendering them non-conductive, and thereby making ineffective the sinusoidal potentials impressed on the grids. The center dot potentials, however, derived from the several target position generator units, cause center dots to remain on the cathode ray tube screen to mark target positions as long as the patterns are thus cut off. When the switch lever 134 is placed on the point 138 connected to the control grid 139 of the multivibrator tube 116, that tube is held conductive, forcing the tube 114 to remain in the non-conductive state in spite of any trigger pulses received through the conductor 113. As a result, the decoupling tube 119 is held conductive, placing the terminal 124 at ground potential and permitting all three switch tubes 44, 53 and 64 to conduct at all times, so that all sinusoidal pattern element voltages are transmitted and all patterns are displayed continuously on the screen to the exclusion of the center dot.

It has been found that the turning off of the switch tubes 44, 53 and 64 may cause long-period transient changes of charge in the coupling condensers such as 77 and 78, with corresponding effects of instability on the cathode ray tube screen. Consequently means are provided to maintain the switch tube direct current output potential levels relatively constant at the average levels of pattern element potentials during long periods of pattern cut-off. Such periods would occur, for instance, in the circuit mentioned, its cycle period being long enough for 40 target displays in sequence, although only 30 targets are displayed. During the remainder of the cycle period, consisting of about 10 target sequence periods, opportunity for drifting would then occur. In order to eliminate such drifting, three holding triodes 179, 181 and 182 are connected with their anodes and cathodes parallelled with those of the switch tubes 44, 53 and 64 respectively. The control grid of each holding triode is connected to an adjustable source of direct potential and in addition is coupled through a resistance to the alternate gate output terminal 126. Therefore the holding triodes 179, 181 and 182 are made conductive during all times that the switch tubes 44, 53 and 64 are non-conductive, and are made non-conductive when the latter are conductive. As a result, for example, when the switch tube 44 is conductive, its current flow through the cathode resistor 129 causes its cathode potential to remain at a certain value above ground and this direct-current potential is maintained at the condenser 77. On the other hand, when the switch tube 44 is non-conductive the holding triode 179 is conductive and maintains an approximately equal direct-current flow through the cathode resistor 129, so that the same direct-current potential is maintained at all times at the condenser 77, this direct-current being modulated by the alternating-current pattern voltage if maintained by the switch tube 44, and being unmodulated if maintained by the holding triode 179, thus affording no opportunity at any time for a long-term transient to be generated. The operation of the holding triodes 181 and 182 is similar.

The cyclic frequency of 60 cycles per second is generated by a free-running blocking oscillator comprising a triode 141, Fig. 1B, and pulse transformer 142, producing sharp negative and positive pulses. These pules are fed through the conductor 113 to the alternate gate multivibrator 115 (Fig. 1A). This scale-of-two type multivibrator is thereby triggered in successive half cycles by the negative pulses, the positive pulses having no effect, to produce two regular rectangular alternating output potentials having the same frequency of 30 cycles per second but having opposite phase, as has been described. The cycle trigger generator tube 141 also transmits its output pulses through conductors 113 and 143 to a sequence timer, to be described later, for the purpose of initiating its sequential operation.

The length of time or period that the cathode ray of the display is permitted to dwell at each target representation position, and therefore the frequency with which the cathode ray is transferred from target to target is determined by a second free-running blocking oscillator termed the target sequence trigger generator comprising a triode 140 and pulse transformer 144. The constants of this oscillator are such that it generates sharp pulses at a frequency of 2400 cycles per second, the negative portion of each pulse being utilized.

In order to avoid harmful interference between the two blocking oscillator generators that would cause the 60-cycle generator to skip an occasional pulse, the two generator grids are coupled through a very small capacitance 146 with the result that the cycle generator output pulses are exactly synchronized with the 2400 cycle output pulses and therefore never suffer interference with them through phase opposition.

The target sequence pulses are led through conductor 147 to an intensifier gate generator comprising a monostable multivibrator having two triodes 148 and 149. The triode 148 is normally held in the non-conductive condition by returning its grid 150 through a resistor 160 to a source of constant potential less than that of ground. This source is marked for convenience and as an example in Figs. 1A and 1B as "—105." The tube 149 is normally conductive but is made non-conductive by target sequence negative pulses applied from the conductor 147 through the condensers 151 and 152 to the grid 153, positive pulses having no effect. The period of this multivibrator depends principally on the product of the capacitance 152 and resistance 154, and is made to be effectively one-quarter of the target sequence period of 417 microseconds, or 104 microseconds. The primary function of the intensifier gate generator is to generate a rectangular pulse for application to the intensifying grid of the cathode ray tube once in each target sequence period. This intensifying gate pulse is not applied during the entire target sequence period but is applied only during the last quarter thereof so that switching transients will have died out before application of the gate pulse. The principal output for intensification is taken from the resistor 155 as will be later described. A secondary output of the intensifier gate generator is taken from the anode 156 and the signal consists of a single negative rectangular pulse. The triggering pulse for this multivibrator from the conductor 147 is represented in curve A, Fig. 2, and the resulting output potential form is represented in curve D. This rectangular pulse is applied to a small condenser 157 and is differentiated by the latter to the form of curve E, and this pulse is applied to a biased amplifier 158 that is affected by the positive trigger only, the amplified and inverted product being represented in proper time relation in curve F as a negative pulse, which is applied to the sequence timer through a conductor 159.

The sequence timer comprises as many units as there are targets with the addition of other units for special purposes. The units are connected as a chain to operate in sequence and each unit has the function of turning on and off a specific target representation, all targets thus being displayed in sequence once per cycle. Since the sequence timer units are similar, only the first two and the last are shown in schematic detail; the intermediate units being indicated by the rectangle 161, Fig. 1B.

The first sequence timer unit comprises the triodes 162 and 163 connected as a scale-of-two or bistable multivibrator. Normally the triode 162 is conductive and its anode 164 is at a relatively low potential, while the anode 166 of triode 163 is at a high potential. The multivibrator is actuated by a negative cycle pulse impressed from the conductor 143 on the control grid 167, positive pulses having no effect at this time. The multivibrator gate pulse is terminated by a negative pulse applied from the amplifier 158 through the conductor 159 to the grid 168, and the output gate pulse thus produced at the anode 164 is represented by the curve G, Fig. 2, its beginning coinciding with and being originated by the cycle trigger pulse represented in curve B, and its end coinciding with and being effected by the amplifier pulse F. The length of the first pulse from each of the scale-of-two multivibrators is of short duration and is therefore not used as an actuating potential for the deflection commutator 37 (Fig. 1A).

The second sequence timer unit comprising the tubes 169 and 171 is identical with the first except that the starting grid 172 corresponding to grid 167 of the first unit is energized from the anode 164 of the preceding unit through the conductor 173 instead of from the cycle trigger conductor 143. Thus a negative pulse through the conductor 173 caused by the termination of the first unit gate pulse and coincident therewith initiates the second unit gate pulse. This is indicated at time $t$ in curve H. The second unit gate pulse is terminated by a pulse, the second of curve F, applied from the intensifier gate amplifier upon the termination of the intensifier gate pulse through the common conductor 159 that is paralleled to all sequence units.

All subsequent units operate in sequence in exactly the same manner as the second unit, each being started by the termination of the preceding unit, and each being stopped by an intensifier gate termination pulse obtained through conductor 159. The principal output signals are obtained as single negative rectangular half cycle pulses from the anode 174 of the second unit and similar anodes of succeeding units. These gate pulses are illustrated in curve K for the second unit and the first seven units are shown in condensed time units in Fig. 3. A final unit is added comprising the pair of multivibrator tubes 217 and 218 in addition to the units required for target sequencing. The negative pulse output potential of this unit is employed for off-time switching of the deflection commutator in a manner that will be described later.

The several curves C, G, H, J, K of Fig. 2 and the curves of Fig. 3 illustrate that the first unit gate pulse has only one quarter the duration of the gate pulses of the remaining units, and therefore its output is not applied to the deflection commutator 37 (Fig. 1A), but the output gate pulses of all other units except the last have full and equal duration and are so utilized. The output potentials such as those illustrated in Fig. 3 except that of the first unit are impressed by means of conductors 176 and 177 on the deflection commutator 37 (Fig. 1A). Similarly, the output potentials from some 28 additional conductors from intermediate units represented by the line 178 leading from the rectangle 161 are impressed on the deflection commutator 37.

The deflection commutator 37 is a multiunit electronic switch that is timed by the cycle generator and the target sequence generator. It receives position signals from the target position generator and pattern signals from the pattern generator, combines them and delivers the composite signal to the display deflection circuits. All deflection units of the deflection commutator are alike, so that but one will be described in detail.

The single unit of the deflection commutator, as schematically shown in Fig. 1A, comprises a triode 183 and a switching diode 184 through which the pulses for controlling the Y-axis deflection for a particular target is impressed on the deflecting means of the cathode ray tube and a triode 186 and switching diode 187 through which the pulses for controlling the X-axis deflection for the same target are delivered to the deflecting means of the CRT. As before described, a direct-current voltage having a magnitude representing the Y-coordinate of the target position is delivered by the target position generator through conductor 28. This voltage magnitude may vary, for instance, between zero and any predetermined maximum value, preferably in the neighborhood of +30 volts. The conductor 28 is connected through a cathode resistor 188 to the cathode 189 of the triode 183. The diode 184 is connected to the positive side of a source of potential by means of a bus bar 192, common to all units, and a high resistance 191. The pair of conductors 109 from the resolver rotor coil 108 of the pattern generator are connected to the triode cathode 189 and the diode cathode 193, so that the Y-axis pattern component output potential is applied between these two cathodes. If the first target indicia were to have characteristic pattern then the circuit could be simplified by connecting the cathode 189 directly to the cathode 193. Such a connection for direct-current does in fact exist if the resolver coil 108 is of low resistance, for the output of this coil is alternating with no direct-current component. The triode grid 194 is normally positive since it is connected to conductor 176 which is normally positive except during the period of its particular sequence pulse transmitted from the sequence timer, as previously mentioned. Under these conditions the triode 183 is conducting, the current flowing from the anode 196 to the cathode 189, and through the cathode resistor 188 to the voltage divider 26 and to ground. The potential drop through the resistor 188 is sufficient to raise the potential of the cathode 189 and thereby raising the potential of the cathode 193 above the potential of the diode anode 197, holding the diode non-conductive. This is possible because the potential of the common bus 192 is held to a relatively low value at such times by means to be described. A negative pulse produced by the second unit of the sequence timer is impressed through conductor 176 on the associated first unit of the deflection commutator, and the negative pulse is thus applied to the grid 194 of the triode 183 making it non-conductive for the duration of the pulse. The current in the cathode resistor 188 consequently becomes zero; the direct-current potential on the diode cathode 193 becomes that of the slider 26 in accordance with its position on the voltage divider 27. Under this condition, the diode anode 197 is positive with respect to the diode cathode 193 and consequently the diode becomes conductive, the anode 197 and also the common bus 192 thereby approach substantially the same potential as that of the slider 26.

A similar action of the triode 186 and switching diode 187 simultaneously imposes substantially the same potential as that of the slider of the voltage divider 31 upon the common X-axis bus 198 during this period of the negative pulse transmitted through the conductor 176 to the grids of both triodes 183 and 186.

All of the other units of the deflection commutator are represented by the rectangles 199 and 201 and all are operated in sequence as described for the first unit. Consequently 30 successive potentials each of which has a desired value between zero and a maximum predetermined positive value, for example, 30 volts, are impressed successively upon the X-axis bus 198 and at the same time 30 successive desired potentials are impressed on the Y-axis bus 192. During these 30 periods, therefore, the bus potentials vary but are never above about 30 volts. However, during the remainder of the cycle, when no target generator voltages or target pattern pulses are impressed upon the buses 192 and 198 their potentials tend to rise above their normal positive value because the respective diodes 184 and 187 are non-conductive and there is therefore zero current in the bus resistors 191 and 202. To prevent this a switch triode 200 and two diodes 203 and 204, controlled by the final sequence timer unit, are provided to draw current through the resistors 191 and 202 during the interval in the cycle from the end of the 30th target presentation to the end of the cycle. To this end, the triode 206 is connected to the cathode 211 of the triode 200 through a resistor 209, and due to the normally flowing tube current, the potentials of both cathode and grid are reasonably near the same value, a large drop existing in the cathode resistor 208. The cathode 211 is connected to both cathodes 212 and 213 of the diodes 203 and 204 respectively, and the anodes 214 and 216 of these diodes are connected to the common buses 192 and 198 respectively. Since the cathodes 212 and 213 have higher positive values than their respective anodes 214, 216 the diodes are non-conductive during pattern periods. However, when the 30th pattern presentation period has terminated the final sequence timer unit comprising the triodes 217 and 218, Fig. 1B, is turned on and stays on until the end of the cycle. The tube 217 is normally non-conductive, but when the final sequence timer unit is turned on the tube 217 is made conductive and its anode 220 is reduced in potential and a negative potential pulse is consequently applied from the anode 220 through the conductor 219 to the grid 206 of the tube 200, rendering the latter non-conductive. Consequently the current in cathode resistor 208 is reduced and the potential of the anodes 211, 212 and 213 drops to the potential of the fixed bias battery 207. Meanwhile, since no pattern voltages are being transmitted, the potentials of the buses tend to rise toward +B potential so that the diodes 203 and 204 become conductive. As a result, the potential of the battery 207 is communicated through the diodes 203 and 204 to the buses 192 and 198 and their potential during this period is regulated to a value approximating the average pattern potential value by adjusting the battery 207.

Referring again to the intensifier gate generator comprising the multivibrator tubes 148 and 149, Fig. 1B, the pricipal output is taken from a tap of the resistor 155 as before mentioned. This output consists of a positive potential gate pulse or rectangular half-cycle of about 104 microseconds, or one-quarter of a target period. The gate pulses are impressed through a conductor 221 to the grid 241 of an amplifying triode 222. The inverted amplifier pulse is impressed through the conductor 223 to a mixer triode 224 and the positive gate pulse from the anode 226 thereof is conveyed through the conductor 227 to the intensifying grid 228 of a cathode ray tube 229. This cathode ray tube creates and displays the indicia patterns hereinbefore mentioned, and the periodic positive energization of its intensifying electrode causes the display on its screen during each interval of such energization of all the sequential target representations. During the remaining time the control grid 231 of the mixer tube 224 is positively biased, so that the anode 226 has a relatively low potential which is communicated to the cathode ray tube grid 228, with the result that the cathode ray does not produce a trace on the screen between sequentially displayed targets.

It is desired that the cathode ray be blanked out or reduced in intensity during the first sequence timer pulse, which is not used for the reason previously mentioned, nor during the interval within the cycle from the last target period to the end of the cycle. To this end, the anode 166 of the tube 163 of the first sequence timer unit is connected through conductor 232 and condenser 233 to the control grid 234 of a triode which with triode 237 forms a bistable or scale-of-two multivibrator. The tube 163 supplies a square wave pulse to the control grid 234 making the tube 236 non-conductive for the duration of this pulse. This pulse is also conducted to the grid 238 of a cathode follower 239, the cathode of which is connected to the grid 241 of the amplifier tube 222. As a result, the grid 241 is held negative for the duration of the first sequence timer pulses, and the cathode ray tube remains dark. However, the termination of this pulse constitutes a positive surge that makes the multivibrator tube 236 become conductive, and because of its design characteristics and its associated circuit its grid 234 remains highly positive thereafter. This potential, created as a result of the positive surge through tube 236, is communicated to the grid 238 of the cathode follower 239 applying such positive bias to the tube 222 as to condition it to serve as an amplifier so that intensifying pulses applied through the conductor 221 to its grid 241 are amplified and supplied to the control grid of the cathode ray tube to intensify its cathode ray stream, the tube 222 being so biased that negative pulses block the cathode ray.

At the termination of the last target presentation period, the final unit of the sequence timer comprising the tubes 217 and 218 is turned on, with the result that a long positive gate pulse is initiated at the anode 242. This positive gate pulse is delivered through the conductor 243 to the grid 244 of the multivibrator tube 237, turning on the latter the resultant negative pulse applied to the grid of the tube 236 to become non-conductive for the remainder of the cycle. This places a negative bias on the grid 241 of the tube 222, cutting it off and forcing the cathode ray tube screen to remain dark. The gate is terminated at the termination of the first sequence gate of the following cycle.

If the pattern for a particular target is to consist of a Lissajous figure with a section removed or "bitten" out, a reduction of intensity of the display may be made during the same part of each repetition of the Lissajous figure. This "bite" is generated from the sine wave or waves that compose the pattern. To accomplish this a connection is made from the desired unit of the sequence timer, such as the second unit anode 246 of tube 169 which produces a positive gate pulse to time the duration of its synthetic target presentation. The connection is made from the anode 246 through conductor 247 to a normally non-conductive switch tube 248 and during the positive gate pulse this tube is thereby made conductive. The resulting amplified inverted gate pulse is again amplified and inverted in the amplifier 249 and applied to the grid 251 of a heavily negatively biased tube 252, so that this tube is turned on to operate as a clipper amplifier during the positive gate pulse and is not conductive at other times. The grid 251 of this tube 252 is likewise connected through a phasing condenser 256 to the anode 41 of the sine generator tube 39 which is a component of the pattern generator. Tube 252 is normally biased below cutoff so that no current flows in its plate circuit except when the positive peaks of the gate pulse are applied to the grid 251. The resultant pulses in the plate circuit of tube 252 are amplified, inverted, differentiated and thus sharpened by the condenser 257, and are again amplified and inverted by the amplifier 258, resulting in strong, sharp positive pulses. These latter pulses are so phased that one occurs during the desired portion of the cycle of the voltages which generate one of the Lissajous figures. These pulses are impressed through the conductor 259 on the grid 261 of a triode 262, that together with the triode 224 constitutes the mixer for providing control voltages for the control grid of the cathode ray tube, as previously mentioned. The triode 262 is normally biased below cutoff. The positive pulses cause the normally non-conducting triode 262 to conduct, reducing the potential on the intensifying grid 228 of the cathode ray tube 229 for the duration of each peak and thus causing a gap or "bite" in the Lissajous figure that is being displayed at the time.

A number of similar circuits like that of the tube 248 for producing small discontinuities in pattern figures may be required, and such circuits are indicated in Fig. 1B by the rectangle 260 actuated through the group of conductors represented by the numeral 265, from any desired units of the sequence timer as represented by the rectangle 161. The output anodes of all units are parallelled.

The varying step potentials impressed by the deflection commutator 37 upon the common buses 192 and 198 for controlling the respective Y-axis and X-axis cathode ray tube deflections, are impressed upon two deflection circuits represented by the rectangles 263 and 264, which may be of any desired type. The output electrical quantities of these deflection circuits actuate the deflection means of the cathode ray tube 229. This tube is preferably of the magnetic deflection type, and the four coils 266, 267, 268 and 269 represent the deflection coils.

It will be readily understood from the foregoing description that the present invention provides apparatus for displaying indicia patterns which may represent simulated or real targets and that the patterns may be varied in numerous ways to convey certain information or characteristics regarding the targets. The indicia patterns are presented sequentially so as to indicate the changing relative positions of the targets. If desired, the frequency of the cycles of sequential presentation may be such that all of the targets appear simultaneously to the eye, or alternatively, the persistence of luminosity of the screen and the cycle frequence may be such that only the targets in a given sector are sequentially presented in a manner similar to that of a conventional P. P. I. radar scope display.

Although the invention has been described with reference to specific embodiments, it is to be understood that there are many variations within the scope of the present invention.

What is claimed is:

1. An apparatus of the type described for visually and sequentially displaying indicia patterns comprising, a cathode ray tube having cathode ray deflecting means, means for providing pairs of direct-current voltages proportional to desired values each pair of which represents certain characteristics to be indicated by an indicia pattern, means for providing a plurality of cyclic voltage pulses having a predetermined time phase for generating two dimensional pattern traces on said cathode ray tube, commutator means for sequentially adding each pair of direct-current voltages and the instantaneous values of certain of said cyclic voltage pulses and for applying the resultant component voltages to said deflecting means, and means for cyclically controlling said commutator means, thereby tracing indicia patterns disposed with respect to a point which is determined by the relative values of the direct-current voltages.

2. An apparatus as defined in claim 1 in which said cathode ray tube is provided with a control grid, and means for applying control voltages to said control grid to blank out the cathode ray trace between indicia patterns.

3. An apparatus for visually displaying a plurality of indicia patterns sequentially within the limits of persistence of vision of the human eye comprising, a cathode ray tube having cathode ray deflecting means for deflecting a cathode ray in two directions at right angles to each other to produce two dimensional pattern traces and a control grid, means for providing pairs of direct-current voltages each pair of which may represent a desired characteristic of certain of said indicia patterns, means for providing separate series of cyclic voltage pulses, means for sequentially adding instantaneous values of said cyclic voltage pulses to each pair of said direct-current voltages to provide a sequential series of composite voltages, timing means for applying the respective composite voltages to said cathode ray deflecting means and means for modulating said cathode ray.

4. An apparatus as defined in claim 3 in combination with means for varying the relation between pairs of series of said cyclic voltage pulses to vary the indicia patterns.

5. An apparatus as defined in claim 3 in combination with means for varying the time phase between pairs of series of said cyclic voltage pulses to vary the orientation of said indicia patterns.

6. An apparatus as defined in claim 3 in combination with means for varying the relative time phase between pairs of series of said cyclic voltage pulses and for varying the relative magnitudes thereof to vary the characteristics of said indicia pattern.

7. An apparatus for visually displaying a plurality of indicia patterns sequentially within limits of persistence of vision of the human eye comprising, a cathode ray tube having deflecting means for causing a cathode ray to trace two-dimensional patterns and a control grid for controlling the cathode ray thereof, means for applying to said deflecting means direct-current voltages which represent certain characteristics of said indicia patterns, means for providing a plurality of series of cyclic voltage pulses representative of other characteristics of said indicia patterns, means for sequentially combining cyclic and direct-current voltages to provide a plurality of composite voltages representing characteristics of a plurality of individual patterns, a source of control voltage for said control grid, and timing means for sequentially applying said composite voltages to said deflecting means in timed relation with the application of said control voltage to said control grid.

8. Means for visually displaying indicia patterns which may represent targets having changing characteristics comprising, a cathode ray tube having first cathode ray deflecting means and a second ray deflecting means effective to move the cathode ray in directions at right angles to each other, and a control grid, means for supplying direct-current voltages which represent certain characteristics of said indicia patterns, means for producing a plurality of cyclically varying voltages, means for combining one of said direct-current voltages with one of said varying voltages, means for applying a control voltage to said grid, and means for sequentially applying composite voltages to said deflecting means representing desired characteristics of said patterns in timed relation with the application of said control voltage to said control grid.

9. Apparatus for visually and sequentially displaying individual patterns representing individual targets comprising, means for generating voltages proportional to the coordinates of target positions, electrical generating means for producing alternating voltages representing identification characteristics of said targets, an electrical timing oscillator having at least two output frequencies, a deflection commutator connected to said electrical timing oscillator for control of the latter and connected to said means for generating said alternating voltages whereby said coordinate voltages are selectively added to said voltages to form alternating composite voltages representing target characteristics, and a cathode ray tube having deflecting means connected to said deflection commutator and a control grid connected to said electrical timing oscillator for control of the cathode ray stream whereby indicia patterns are displayed on the cathode ray tube screen having characteristics represented by said composite voltages.

10. Apparatus for visually and sequentially displaying individual patterns representing target characteristics comprising, means for generating direct-current voltages proportional to the coordinates of target positions, an electrical pattern generator for producing a plurality of cyclic time-voltage output quantities, a first electrical generator of a cyclic frequency that is at least high enough to minimize visual flicker, a second electrical generator of a target sequence frequency higher than said cyclic frequency, a sequencing circuit comprising an electronic chain having at least as many links as there are targets and actuated by said first and second electrical generators, a plurality of output circuit connections for said sequencing timing circuit there being at least one output connection from each said link whereby rectangular pulses are generated in the output connections of successive links at the sequence frequency, a deflection commutator connected to said timing circuit for chronological control thereby and connected to said means for generating voltages and to said electrical pattern generator for adding the instantaneous voltages thereof to form addition voltages representing target characteristics, and a cathode ray tube having deflecting means connected to said deflection commutator for deflection by the addition voltages thereof, said cathode ray tube also having a grid connected to said timing circuit for control of the intensity of displayed individual target patterns.

11. Apparatus for visually and sequentially displaying individual indicia patterns representing target characteristics comprising, means for providing voltages proportional to the coordinates of target positions, an electrical generator for producing alternating voltages representing pattern elements, a discharge tube switch in the output of said generator for control of the latter, means for individually adjusting the voltage magnitudes of said pattern element outputs, means for combining the voltages representing said pattern elements a pair at a time in phase quadrature, means for changing the relative magnitudes of the alternating voltages representing said patterns composing each of said pairs, an electrical timing oscillator having at least two output frequencies, a deflection commutator controlled by said electrical timing oscillator and connected to said electrical generator and to said means for combining said alternating voltages, whereby the voltages are added to form composite voltages representing target characteristics, and a cathode ray tube having deflecting means connected to said deflection commutator for deflection of the cathode ray by the composite voltages, said cathode ray tube also having a control grid connected to said electrical timing oscillator for blanking out the cathode ray between display of the individual patterns.

12. Apparatus for visually and sequentially displaying individual patterns representing target characteristics comprising, means for providing constant voltages proportional to the coordinates of target positions, an electrical timing oscillator having at least two output frequencies, an electrical generator having a plurality of outputs for producing alternating voltages representing individual patterns, a discharge switch tube in each of said outputs, an alternate gate generator connected between said electrical timing oscillator and all of said discharge switch tubes for cyclic alternate opening and closing of the latter, means for adjusting the voltage magnitude of one of said outputs in accordance with target speed, means for adjusting the output voltage magnitude of another of said outputs in accordance with a value representing future time, a two-phase to two-phase resolver for combining the outputs of said two outputs to form composite voltages, a cathode ray tube having deflecting means and a control grid for controlling the cathode ray, and a commutator connected to said means for providing constant voltages and controlled by said electrical timing oscillator for combining, respectively, one of said composite voltages and one of said constant voltages and applying the resultants representing target characteristics to said deflecting means, said control grid being controlled by said timing oscillator to blank out the cathode ray between sequentially displayed target patterns.

13. Apparatus for visually and sequentially displaying individual patterns representing target characteristics comprising, a cathode ray tube having deflecting means and a control electrode for controlling the cathode ray, means for generating direct-current voltages proportional to the coordinates of target positions, an electrical pattern generator having a plurality of outputs of independently cyclically time-varying quantities, a cycle generator, a sequence generator for generating a frequency higher than that of said cycle generator, a timing circuit actuated by said cycle generator and said sequence generator for producing successive electrical gates in said plurality of outputs, a deflection commutator connected to and controlled by said timing circuit, and connected to said means for generating said direct current voltages and to said electrical pattern generator for adding the instantaneous voltages thereof to form composite voltages representing target characteristics, said deflection commutator also operatively associated with said deflection means of said cathode ray tube and said timing circuit operatively associated with said control grid.

14. An apparatus for visually displaying discrete target indicia patterns wherein an input indicative of course and an input indicative of speed is provided for each target to be displayed comprising, means for combining said course and speed inputs and for producing therefrom direct current voltages proportional to coordinates of position, a pattern generator for generating a plurality of cyclic voltages having a predetermined relative phase, means for combining said cyclic voltages to produce a two dimensional pattern trace, means for controlling said combining means by said course input to orient said two dimensional pattern trace in accordance with said course input, a commutator for sequentially adding selected direct current voltages proportional to position and selected cyclic voltages determinative of pattern, a cathode ray tube including deflection circuits, and means for cyclically impressing the output of said commutator on said deflection circuits.

15. An apparatus for visually displaying discrete target indicia patterns wherein an input indicative of course and an input indicative of speed is provided for each target to be displayed comprising, means for combining said course and speed inputs and for producing therefrom direct current voltage proportional to coordinates of position, a pattern generator for generating a plurality of cyclic voltages having a predetermined relative phase, means controlled by said speed input for adjusting the amplitude of at least one of said cyclic voltages, means for combining said cyclic voltages to produce a two dimensional pattern trace, means for controlling said combining means by said course input to orient said two dimensional pattern trace in accordance with said course input, a commutator for sequentially adding selected direct current voltages porportional to position and selected cyclic voltages determinative of pattern, a cathode ray tube including deflection circuits, and means for cyclically impressing the output of said commutator on said deflection circuits.

16. An apparatus for visually displaying discrete target indicia patterns wherein an input indicative of course and an input indicative of speed is provided for each target to be displayed comprising, a cathode ray tube including deflection circuits, means jointly controlled by said course and speed inputs for producing direct current voltages proportional to coordinates of position, a pattern generator for generating a plurality of cyclic voltages having a predetermined relative phase, respective means for combining selected amplitudes of selected ones of said cyclic voltages to produce distinctive patterns for each target to be displayed, means for controlling the respective combining means by the respective course input for each particular target whereby the distinctive patterns of each target displayed are oriented in accordance with their respective courses, means for adjusting the amplitude of at least one of said cyclic voltages as combined to produce distinctive patterns for each said target by the respective speed inputs for each said target whereby at least one linear dimension of each target pattern is proportional to the speed of said target, means for simultaneously adjusting the amplitudes of said speed adjusted cyclic voltages of a plurality of targets whereby the future position of said targets is forecast by a dimension of said target patterns, means for combining said cyclic pattern forming voltages with respective direct current voltages proportional to coordinates of position and for sequentially impressing said combined voltages on said cathode ray deflection circuits.

17. An apparatus for visually displaying discrete target indicia patterns as defined in claim 16 in which said cathode ray tube includes a control electrode and means for applying a voltage thereto to blank out the cathode ray trace during a portion of the time said combined voltages are impressed on said cathode ray deflection circuits.

References Cited in the file of this patent

UNITED STATES PATENTS

| Number | Name | Date |
|---|---|---|
| Re. 22,672 | Shumard | Aug. 28, 1945 |
| 2,292,045 | Burnett | Aug. 4, 1942 |
| 2,314,920 | Bumstead | Mar. 30, 1943 |
| 2,399,661 | Bowie | May 7, 1946 |
| 2,403,429 | Anderson | July 9, 1946 |
| 2,406,799 | Busignies | Sept. 3, 1946 |
| 2,412,703 | Wolff | Dec. 17, 1946 |
| 2,420,303 | De France | May 13, 1947 |
| 2,421,747 | Englehardt | June 10, 1947 |
| 2,427,905 | Flyer | Sept. 23, 1947 |
| 2,440,538 | Chalberg | Apr. 27, 1948 |
| 2,447,507 | Kenyon | Aug. 24, 1948 |
| 2,464,558 | Dammers | Mar. 15, 1949 |
| 2,475,212 | Wolff | July 5, 1949 |
| 2,512,923 | Dippy | June 27, 1950 |
| 2,555,442 | Hales | June 5, 1951 |
| 2,604,705 | Hisserich et al. | July 29, 1952 |

OTHER REFERENCES

Hess, Abstract Publication Ser. No. 516,942, published August 16, 1949.